US012698662B2

(12) United States Patent
Kachari et al.

(10) Patent No.: US 12,698,662 B2
(45) Date of Patent: Aug. 4, 2026

(54) ECCENTRIC ASSEMBLY FOR A SLIDING DOOR

(71) Applicant: KINECO LIMITED, Bardez (IN)

(72) Inventors: Partha Sarathi Kachari, Pune (IN); Sameer Hameed Chopdar, Siolim (IN); Vardhan Kinjawadekar, Ella (IN)

( * ) Notice: Subject to any disclaimer, the term of this patent is extended or adjusted under 35 U.S.C. 154(b) by 0 days.

(21) Appl. No.: 18/285,859

(22) PCT Filed: Jul. 2, 2021

(86) PCT No.: PCT/IN2021/050648
§ 371 (c)(1),
(2) Date: Oct. 6, 2023

(87) PCT Pub. No.: WO2022/219641
PCT Pub. Date: Oct. 20, 2022

(65) Prior Publication Data
US 2024/0200379 A1 Jun. 20, 2024

(30) Foreign Application Priority Data
Apr. 16, 2021 (IN) ............................ 202121017822

(51) Int. Cl.
*E05D 15/06* (2006.01)
*E05F 15/643* (2015.01)

(52) U.S. Cl.
CPC ....... *E05D 15/063* (2013.01); *E05D 15/0634* (2013.01); *E05F 15/643* (2015.01)

(58) Field of Classification Search
CPC . E05D 15/063; E05D 15/643; E05D 15/0634; E05Y 2201/462; E05Y 2201/22; E05Y 2201/46; E05Y 2600/46; E05Y 2800/31; E05Y 2201/652; E05Y 2600/60
USPC ...................... 49/425, 409; 16/94 R, 97, 105
See application file for complete search history.

(56) References Cited

U.S. PATENT DOCUMENTS 2,999,267 A * 9/1961 Sterling .............. E05D 15/0634 16/105
3,006,443 A * 10/1961 Siler ....................... F16B 5/025 29/464
3,142,859 A * 8/1964 Suska ................. E05D 15/0634 16/105
3,203,027 A * 8/1965 Ohman ............... E05D 15/0634 16/105
3,457,676 A * 7/1969 Ziegler ............... E05D 15/0647 16/93 R (Continued)

FOREIGN PATENT DOCUMENTS

CN 2630946 Y * 8/2004
CN 104742699 A * 7/2015 .......... B25J 15/0608

(Continued)

*Primary Examiner* — Justin B Rephann
(74) *Attorney, Agent, or Firm* — Rahman LLC

(57) ABSTRACT

According to an embodiment herein, a door eccentric assembly (100) is disclosed. The door eccentric assembly (100) includes a door eccentric (102) with an eccentric hole (103). The door eccentric assembly (100) is connected with a bogie (202) of a bogie assembly (200) and the bogie assembly (200) is configured to connect with a door leaf (302) through the eccentric hole (103) positioned at an offset from the central axis of the door eccentric (102).

7 Claims, 5 Drawing Sheets

(56) References Cited

U.S. PATENT DOCUMENTS

| | | | | | |
|---|---|---|---|---|---|
| 3,661,431 | A * | 5/1972 | Wisecarver | F16C 29/045 | 384/58 |
| 4,106,876 | A * | 8/1978 | Tregoning | E05D 15/0634 | 16/DIG. 34 |
| 4,134,178 | A * | 1/1979 | Stevens | E05D 15/0669 | 16/105 |
| 4,375,019 | A * | 2/1983 | Yoshida | E05F 15/643 | 200/61.42 |
| 4,653,127 | A * | 3/1987 | Baus | E05D 15/0634 | 4/607 |
| 4,698,876 | A * | 10/1987 | Karita | H02N 15/00 | 16/102 |
| 4,738,052 | A * | 4/1988 | Yoshida | E05F 1/006 | 49/31 |
| 4,910,917 | A * | 3/1990 | Brauer | B60J 1/17 | 49/452 |
| 5,070,575 | A * | 12/1991 | Redman | E05D 15/0639 | 16/98 |
| 5,115,596 | A * | 5/1992 | Fevold | E05D 15/0626 | 49/411 |
| 5,121,817 | A * | 6/1992 | Garrido | B66B 13/30 | 187/313 |
| 5,127,190 | A * | 7/1992 | Hein | E05F 15/73 | 49/31 |
| 5,404,675 | A * | 4/1995 | Schmidhauser | E05D 15/063 | 16/97 |
| 5,449,243 | A * | 9/1995 | Haab | A47K 3/30 | 403/3 |
| 6,079,162 | A * | 6/2000 | Hein | E06B 3/50 | 49/6 |
| 6,185,784 | B1 * | 2/2001 | Gamperle | E05D 15/0634 | 16/99 |
| 6,966,722 | B1 * | 11/2005 | Borror | F16B 43/00 | 403/243 |
| 7,246,688 | B2 * | 7/2007 | Tonna | E05F 15/635 | 187/324 |
| 7,322,555 | B2 * | 1/2008 | Dziwak | E05D 15/0652 | 248/327 |
| 7,730,670 | B2 * | 6/2010 | Whitaker | E05D 15/0652 | 49/425 |
| 7,748,178 | B2 * | 7/2010 | Haab | B32B 17/10036 | 403/388 |
| 7,891,052 | B2 * | 2/2011 | Haab | E05F 5/003 | 16/98 |
| 8,109,040 | B2 * | 2/2012 | Finke | E05F 15/60 | 49/404 |
| 8,393,114 | B2 * | 3/2013 | Haab | E05F 5/003 | 16/98 |
| 9,234,376 | B2 * | 1/2016 | Trulaske, Sr. | E05D 15/0652 | |
| 9,249,609 | B2 * | 2/2016 | Takahashi | E05F 15/643 | |
| 9,290,977 | B2 * | 3/2016 | Haab | E05D 15/0652 | |
| 9,534,624 | B2 * | 1/2017 | Rautionmaa | E02F 3/3613 | |
| 11,001,277 | B2 * | 5/2021 | Cartier | B61D 19/005 | |
| 11,002,052 | B2 * | 5/2021 | Terno | E05D 15/0626 | |
| 2001/0003855 | A1 * | 6/2001 | Zingg | E05D 15/0634 | 16/105 |
| 2004/0255517 | A1 * | 12/2004 | Inage | E05D 15/0652 | 49/409 |
| 2006/0039749 | A1 * | 2/2006 | Gawehn | F16B 5/025 | 403/367 |
| 2006/0134377 | A1 * | 6/2006 | Ernewein | E06B 3/5436 | 428/137 |
| 2008/0092330 | A1 * | 4/2008 | Haab | E05F 5/003 | 16/98 |
| 2009/0284024 | A1 * | 11/2009 | DeLeonardis | E05B 47/0002 | 70/95 |
| 2010/0031577 | A1 * | 2/2010 | Haab | E05D 15/0652 | 49/449 |
| 2011/0138692 | A1 * | 6/2011 | Lemstra | E05F 15/643 | 49/358 |
| 2011/0173891 | A1 * | 7/2011 | Laliberte | E05F 15/632 | 70/95 |
| 2016/0138311 | A1 * | 5/2016 | Kreyenborg | E05D 15/063 | 49/506 |
| 2020/0096027 | A1 * | 3/2020 | Mongeau | F16B 5/025 | |
| 2020/0224473 | A1 * | 7/2020 | Terno | E05D 15/0626 | |
| 2022/0251894 | A1 * | 8/2022 | Muggiasca | A61L 2/07 | |
| 2024/0200379 | A1 * | 6/2024 | Kachari | E05F 15/643 | |

FOREIGN PATENT DOCUMENTS

| | | | | | |
|---|---|---|---|---|---|
| CN | 207017842 | U | * | 2/2018 | |
| CN | 109222600 | A | * | 1/2019 | A47G 29/12 |
| CN | 209942515 | U | * | 1/2020 | |
| CN | 112523658 | A | | 3/2021 | |
| CN | 214303474 | U | * | 9/2021 | |
| CN | 109732060 | B | * | 1/2024 | |
| DE | 10334920 | A1 | | 2/2005 | |
| GB | 2182085 | A | * | 5/1987 | A47K 3/34 |
| JP | H06146717 | A | * | 5/1994 | |
| JP | 2021130998 | A | * | 9/2021 | |
| KR | 20030041670 | A | | 5/2003 | |
| TW | 202100857 | A | | 1/2021 | |

* cited by examiner

ECCENTRIC ASSEMBLY FOR A SLIDING DOOR

FIELD OF THE INVENTION

The present embodiment relates to a sliding door, and more particularly to an eccentric assembly to be connected with the sliding door.

BACKGROUND OF THE INVENTION

In general, doors are widely used in buildings or homes to allow access to enter the building or other premises. The doors are provided with a side hinge that enables the door to open or close, upon rotation from the end opposite to the hinge. Such doors occupy space while opening, as they extend into the room or outside the room upon rotation. This arise a need for providing different kind of doors that are more compact while in operation and are easy to use, therefore concept of sliding door came into picture.

Sliding doors are widely known in prior art as is disclosed in DE patent number 10334920A1 using a roller that slides in a roller carriage for sliding the door. Other references such as KR patent number 20030041670A and TW patent number 202100857A discloses similar assemblies for door sliding including a control mechanism to control the door sliding in cases where required.

The major problem for door sliding mechanisms lies in intricacies of the design of assembly involved in sliding mechanism. A number of components are used in such kind of assembly that increases weight on the door and thereby creating difficulty in door operation. Door sliding assemblies need to be installed correctly to avoid any accident such as lag in opening or closing of the door. Wrong installation of door assemblies can lead to excessive wear and tear of sub-assemblies involved in door sliding mechanism, to door and even to floor as well. Fitting of door leaf with conventional assemblies is much more time consuming, difficult and burdensome as such assemblies involve greater number of components to be settled.

Conventional door sliding mechanisms do not provide a way to try different variants of doors such as single leaf door, double leaf door, curved door, side haul door and underslung door etc with the same assembly. A specific assembly for numerous door variants is required to achieve the purpose and thus involve more time to re-install the assembly.

Keeping in view the intricacies involved in such mechanisms, there is a need for simpler mechanism with a smaller number of components, that enable the installer or mechanic to install doors correctly and, in a fail-proof manner. Further a standard mechanism for easy installation and easy removal for door of various kinds is required.

SUMMARY OF THE INVENTION

In view of the foregoing, an embodiment herein provides a door eccentric assembly (100) including a door eccentric (102) with an eccentric hole (103). The door eccentric assembly (100) is connected with a bogie (202) of a bogie assembly (200) through the eccentric hole (103) positioned at an offset from the central axis of the door eccentric (102).

In an aspect, a bogie assembly (200) is disclosed. The bogie assembly (200) including a bogie (202) and a door eccentric assembly (100) that is connected to the lower end of the bogie (202). The bogie assembly (200) is connected with a door leaf (302) through an eccentric hole (103) of the door eccentric assembly (100) that is positioned at an offset from the central axis of a door eccentric (102) of the door eccentric assembly (100).

In another aspect, a door assembly including a frame (402), a longitudinally extending groove (404) provided on the surface of the frame (402), a guide rail (406) inserted into the groove (404) of the frame (402). A bogie assembly (200) having a bogie (202), a plurality of rollers (204) connected on the upper end of the bogie (202) and a door eccentric assembly (100) connected at the lower end of the bogie (202). The bogie assembly (200) is configured to slide a door leaf (302) by virtue of the plurality of rollers rolling on a guide track (406A) formed on the surface of the guide rail (406). The bogie assembly (200) is connected with the door leaf (302) through an eccentric hole (102) positioned at an offset from the central axis of a door eccentric (102) of the door eccentric assembly (100).

In another aspect, a door leaf (302) is disclosed. The door leaf (302) includes a bogie assembly (200) being connected to the door leaf (302) through a door eccentric assembly (100). The bogie assembly (200) is connected with the door leaf (302) through an eccentric hole (103) positioned at an offset from the central axis of the door eccentric (102) of the door eccentric assembly (100).

BRIEF DESCRIPTION OF DRAWINGS

The above and still further features and advantages of embodiments of the present invention becomes apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION OF THE DRAWINGS

Figure 1:
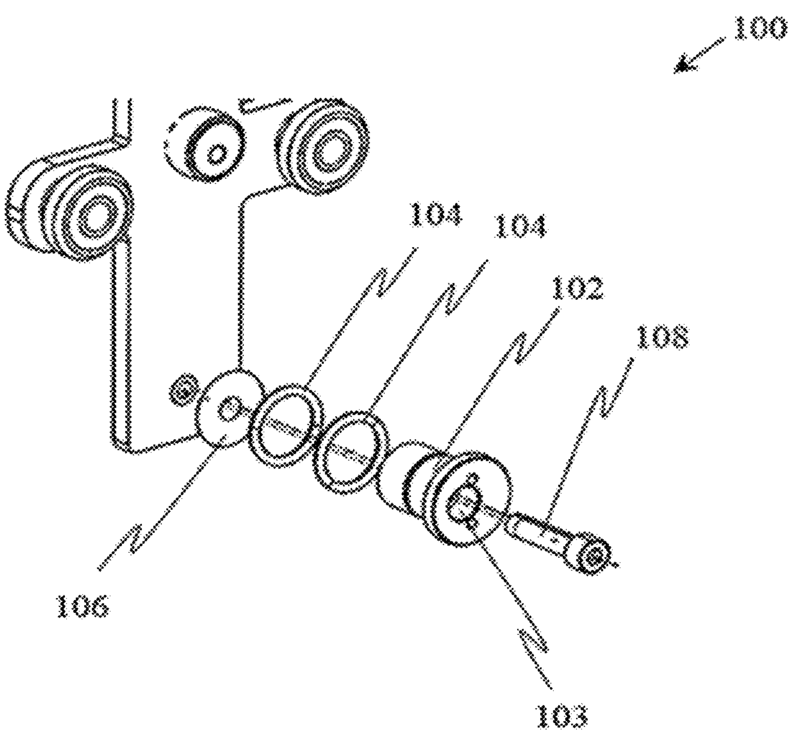
FIG. 1 is an isometric view of a door eccentric assembly according to an embodiment herein.

Various embodiment of the present invention provides a sophisticated assembly for door sliding mechanism. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

The various embodiments including the example embodiments are now described more fully with reference to the accompanying drawings, in which the various embodiments of the invention are shown. The invention may, however, be embodied in different forms and should not be construed as limited to the embodiments set forth herein. Rather, these embodiments are provided so that this disclosure is thorough and complete, and fully conveys the scope of the invention to those skilled in the art. In the drawings, the sizes of components may be exaggerated for clarity.

It is understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "top," "bottom," and the like, may be used herein for ease of description to describe one element or feature's relationship to another element(s) or feature(s) as illustrated in the figures. It is to be understood that the spatially relative terms are intended to encompass different orientations of the structure in use or operation in addition to the orientation depicted in the figures.

Embodiments described herein refer to plan views and/or cross-sectional views by way of ideal schematic views. Accordingly, the views may be modified depending on simplistic assembling or manufacturing technologies and/or tolerances. Therefore, example embodiments are not limited to those shown in the views but include modifications in configurations formed on basis of assembling process. Therefore, regions exemplified in the figures have schematic properties and shapes of regions shown in the figures exemplify specific shapes or regions of elements, and do not limit the various embodiments including the example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a door sliding assembly incorporating a door eccentric.

The present embodiment relates to a sophisticated door sliding assembly involving a door eccentric assembly to be connected with a bogie assembly.

FIG. 1 illustrates an isometric view of a door eccentric assembly (100). The door eccentric assembly (100) includes a door eccentric (102), a pair of O-rings (104), an anti-friction washer (106) and a fastener (108).

The door eccentric (102) further includes an eccentric hole (103). The eccentric hole (103) is a through hole positioned at an off-set from the central axis of the door eccentric (102).

Figure 2:
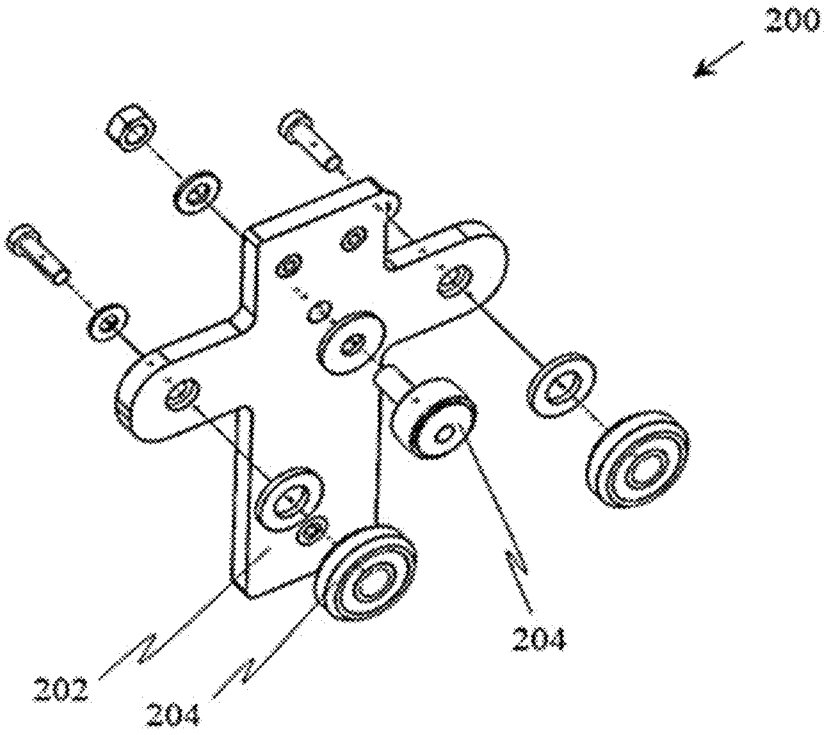
FIG. 2 is an isometric exploded view of a bogie assembly according to an embodiment herein.

FIG. 2 illustrates an isometric exploded view of a bogie assembly (200). The bogie assembly (200) includes a T-shaped bogie (202) and a number of rollers (204).

The number of rollers (204) are connected to the upper end of the T-shaped bogie (202) and the door eccentric assembly (100) is connected to the lower end of the T-shaped bogie (202) of the bogie assembly (200).

The O-rings (104) are configured to provide a seal tight arrangement of the door eccentric (102) and the anti-friction washer prevents any misalignment of the door eccentric (102) when the door eccentric assembly (100) is connected with the bogie assembly (200).

The O-rings (104) and the anti-friction washer (106) are adapted to be packed in between the door eccentric (102) and the lower portion of the bogie (202) of the bogie assembly (200). The fastener (108) is inserted through the eccentric hole (103) provided on the door eccentric (102) to hold the door eccentric assembly (100) with the lower end the bogie (202) of the bogie assembly (200).

In an embodiment, the fastener (108) may be a bolt, a screw, a rivet, a stud, a dowel or any other conventional fastening means.

Figure 3A:
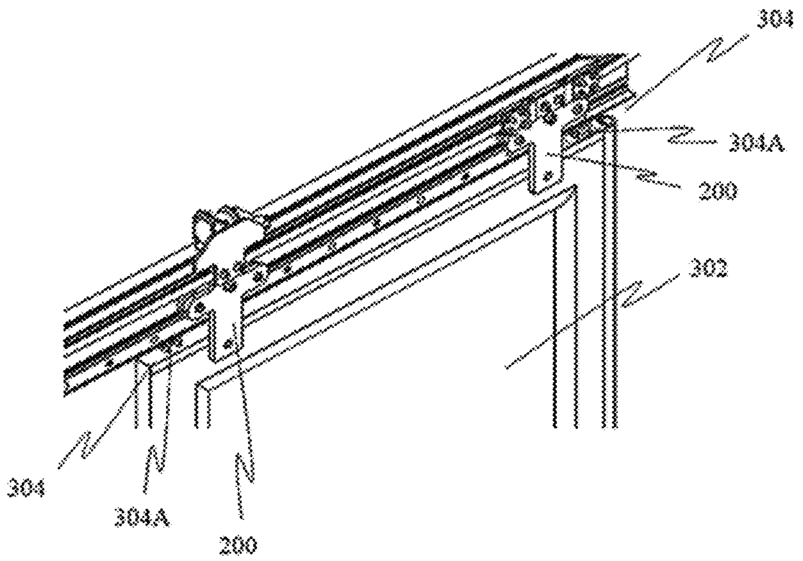
FIGS. 3A and 3B illustrates an isometric view of the bogie assembly being connected to a door leaf according to an embodiment herein.
Figure 3B:
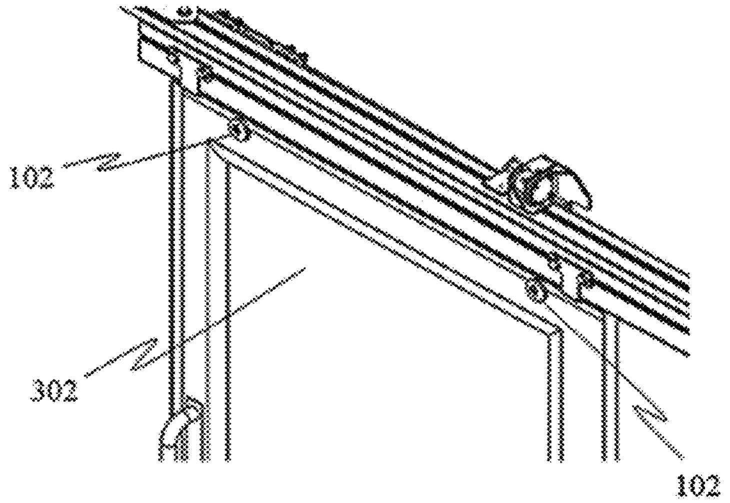

FIGS. 3A and 3B illustrates an isometric view of the bogie assembly (200) being connected to a door leaf (302). A pair of manual lock sensor assemblies (304) is positioned at the top of the door leaf (302) as can be seen from FIG. 3A. The manual lock sensor assembly (304) includes a sensor mounting bracket (304A) and a sensor (not shown) mounted on the sensor mounting bracket (304A). The bogie assembly (200) is configured to connect at the upper end of the door leaf (302) through the fastener (108) of the door eccentric assembly (100). The fastener (108) is passed through the eccentric hole (103) and the corresponding hole (not shown) provided on the door leaf (302) to affix the bogie assembly (200) with the door leaf (302).

In an embodiment, the bogie assembly (200) is connected at any suitable location of the door leaf (302) to reduce the complexity in the structure of door sliding assembly.

In an embodiment, the bogie assembly (200) is connected with the door leaf (302) through a metallic strip (not shown) to adjust the height of the connection of the bogie assembly (200) and the door leaf (302).

In an embodiment, a number of bogie assemblies (200) such as two, three and so on may be connected with the door leaf (302) to support the door leaf (302) properly during the door sliding.

Figure 4:
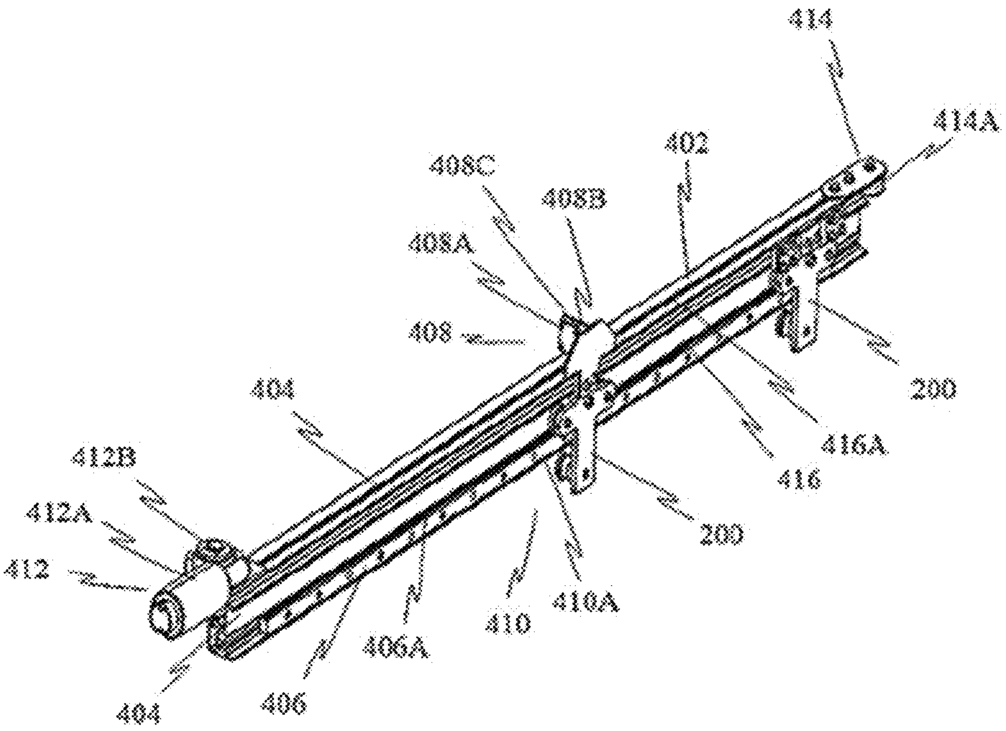
FIG. 4 is an isometric view of a frame on which the door leaf can be connected according to an embodiment herein.

FIG. 4 illustrates an isometric view of a frame (402). The frame (402) includes a number of longitudinally extending grooves (404), a guide rail (406), a pair of electro-magnet assemblies (408), a driver pulley assembly (412), a driven pulley assembly (414) and a belt loop assembly (416).

The longitudinally extending grooves (404) extend longitudinally along the length of the frame (402) on the top surface, the bottom surface and the lateral surface of the frame (402).

The pair of manual lock sensor assemblies (304) are connected to the frame (402) by sliding the sensor mounting bracket (304A) in the groove (404) provided on the lateral surface of the frame (402) through a square nut (not shown) engaged with the sensor mounting bracket (304A) up to a specified distance from the proximal or distal end of the frame (402).

The guide rail (406) is recessed from the top surface to provide a track (406A).

The guide rail (406) is inserted in the groove (404) on the lateral surface of the frame (402). The number of rollers (204) that are connected to the bogie (202) of the bogie assembly (200) are configured to roll on the track (406A) of the guide rail (406).

The electromagnet assembly (408) further includes an electromagnet mounting bracket (408A), an electromagnet (408B) and a sensor (408C).

The sensor (408C) is mounted on the electromagnet mounting bracket (408A) of the electromagnet assembly (408). The pair of electromagnet assemblies (408) are positioned on the frame (402) by sliding the electromagnet mounting bracket (408A) in the longitudinally extending groove (404) on the top surface of the frame (402) through a square nut (not shown) engaged with the electromagnet mounting bracket (408A) up to a specified distance from the proximal or distal end of the frame (402).

The driver pulley assembly (412) further includes a driver motor (412A) and a driver pulley (412B).

The driver motor (412A) and the driver pulley (412B) are mounted on a tension plate (not shown) of the driver pulley assembly (412). The driver pulley assembly (412) is fastened at the proximal end of the frame (402).

In an embodiment, the driver pulley assembly (412) may be fastened at the distal end of the frame (402) considering the uniform structure of the frame (402) throughout its length.

The driven pulley assembly (414) further includes a driven pulley (414A).

The driven pulley (414A) is mounted on a tension plate (not shown) of the driven pulley assembly (414). The driven pulley assembly (414) is fastened at the distal end of the frame (402).

In an embodiment, the driven pulley assembly (414) may be fastened at the proximal end of the frame (402) considering the uniform structure of the frame (402) throughout its length.

The belt loop assembly (416) further includes a pulley belt (416A) and a belt fixing plate (not shown).

The pulley belt (416A) is tied in a closed loop by the belt fixing plate. The free ends of the pulley belt (416A) are clamped by the belt fixing plate. The pulley belt (416A) is tied in a closed loop around the driver pulley (412B) of the driver pulley assembly (412) and the driven pulley (414A) of the driven pulley assembly (414). The belt loop assembly (416) is configured such that the tension of the pulley belt (416A) is adjustable, depending on the load carried by the pulley belt (416A).

The driver motor (412A) of the driver pulley assembly (412) is configured to rotate the driver pulley (412B) which in turn rotates the pulley belt (416A) that is wound around the driver pulley (412B) and the driven pulley (414A). The belt fixing plate is connected with the bogie (202) of the bogie assembly (200) through the pair of holes (not shown) provided at the central region of the belt fixing plate, therefore the driver pulley (412B) when drives the pulley belt (416A), the bogie assembly (200) is configured to roll on the track (406A) of the guide rail (406) by virtue of the number of rollers (204) connected on the bogie (202) and eventually enabling the bogie assembly (200) to slide relative to the frame (402).

The frame (402) carrying the guide rail (406), the electromagnet assembly (408), the manual lock sensor assembly (304), the driver pulley assembly (412), the driven pulley assembly (414) and the belt loop assembly (416) is adapted to fix at any entry point of the building or other premises where door is required.

Figure 5A:
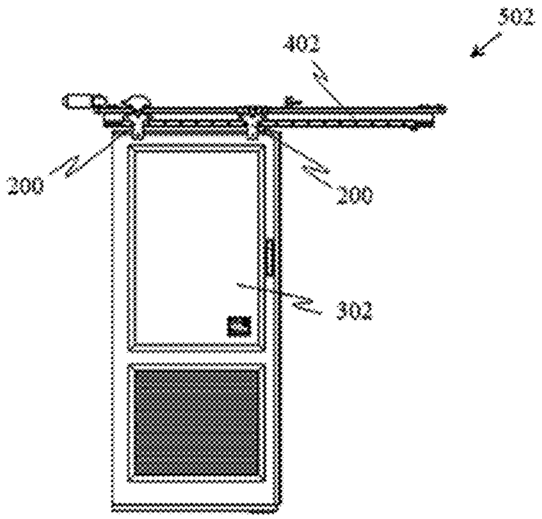
FIGS. 5A and 5B illustrates a front view of the door leaf sliding in an open and closed position thereof according to an embodiment herein.
Figure 5B:
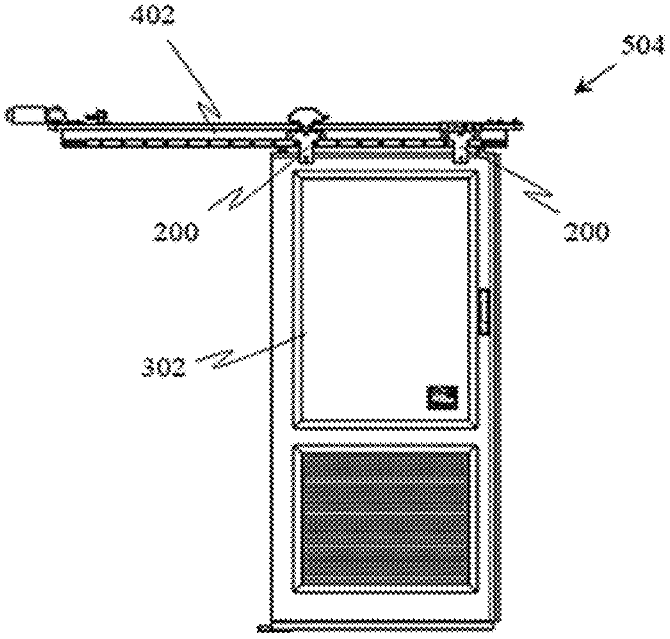

FIGS. 5A and 5B illustrates sliding of the door leaf (302) in an open (502) and closed (504) position.

Since, the bogie assembly (200) is connected with the door leaf (302): therefore, the sliding of the bogie assembly (200) as discussed earlier enables the door leaf (302) to slide relative to the frame (402) in the open (502) and the closed position (504) as can be seen through the FIGS. 5A and 5B respectively. Both the bogie assemblies (200) are provided such that the co-ordination while sliding the door leaf (302) between them is maintained.

In an embodiment various types of door leaves such as a curve door, double-leaf straight door, or double-leaf curve door can be operatively connected with the bogie assembly (200). Further, various arrangements for door leaf mountings including under slung arrangement, below the frame (402) can be used where the space in Y-direction (thickness) is less and side hung arrangement, to side of the frame (402) can be used where the space in Z-direction (height) is less, can be used.

In an aspect, a bogie assembly (200) is disclosed. The bogie assembly (200) including a bogie (202) and a door eccentric assembly (100) that is connected to the lower end of the bogie (202). The bogie assembly (200) is connected with a door leaf (302) through an eccentric hole (103) of the door eccentric assembly (100) that is positioned at an offset from the central axis of a door eccentric (102) of the door eccentric assembly (100).

In another aspect, a door assembly including a frame (402) is disclosed. A longitudinally extending groove (404) provided on the surface of the frame (402), a guide rail (406) inserted into the groove (404) of the frame (402). A bogie assembly (200) having a bogie (202), a plurality of rollers (204) connected on the upper end of the bogie (202) and a door eccentric assembly (100) connected at the lower end of the bogie (202). The bogie assembly (200) is configured to slide a door leaf (302) by virtue of the plurality of rollers rolling on a guide track (406A) formed on the surface of the guide rail (406). The bogie assembly (200) is connected with the door leaf (302) through an eccentric hole (102) positioned at an offset from the central axis of a door eccentric (102) of the door eccentric assembly (100).

In yet another aspect, a door leaf (302) is disclosed. The door leaf (302) includes a bogie assembly (200) being connected to the door leaf (302) through a door eccentric assembly (100). The bogie assembly (200) is connected with the door leaf (302) through an eccentric hole (103) positioned at an offset from the central axis of the door eccentric (102) of the door eccentric assembly (100).

The foregoing discussion of the present disclosure has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present disclosure has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A door assembly for a door leaf, the door assembly comprising:

a frame having a plurality of surfaces;

a groove extending longitudinally on the plurality of surfaces of the frame;
a guide rail having a guide track, wherein the guide rail is inserted into the groove of the frame;
a bogie assembly having:
a bogie, wherein the bogie having a lower end, and an upper end opposite to the lower end,
a plurality of rollers connected to the upper end of the bogie; and
a door eccentric assembly connected at the lower end of the bogie, wherein the door eccentric assembly comprises:
a door eccentric having a central axis, wherein the door eccentric is adapted to be received in a through hole of the door leaf;
an eccentric hole in the door eccentric, wherein the eccentric hole is at an off-set from the central axis, and wherein the eccentric hole is a through hole, and comprises an inner diameter;
a fastener having an outer diameter,
wherein the outer diameter of the fastener directly cooperates with the inner diameter of the eccentric hole to connect the door eccentric,
wherein the door eccentric is configured to be received within a hole of the door leaf, and
wherein the bogie assembly is configured to slide the door leaf through the plurality of rollers rolling on the guide track.

2. The door assembly of claim 1, further comprising:
a driver pulley assembly having a driver pulley,
a driven pulley assembly having a driven pulley, and
a belt loop assembly having a pulley belt wrapped around the driver pulley and the driven pulley to slide the door leaf to open and close the door leaf.

3. The door assembly of claim 1, further comprising:
a pair of electromagnet assemblies having an electromagnet mounting bracket, wherein the pair of electromagnet assemblies is positioned on the frame by sliding the electromagnet mounting bracket in the groove on a top surface of the frame.

4. The door assembly as claimed in claim 1, further comprising:
a pair of manual lock sensor assemblies having a sensor mounting bracket, wherein the pair of manual lock sensor assemblies are connected to the frame by sliding the sensor mounting bracket in the groove of the frame.

5. A door leaf, comprising:
a panel extending between a top end and a bottom end;
a door eccentric assembly coupled to the top end, wherein the door eccentric assembly comprises:
a door eccentric having a central axis,
an eccentric hole in the door eccentric, wherein the eccentric hole is an off-set from the central axis, and wherein the eccentric hole is a through hole, and comprises an inner diameter,
a fastener having an outer diameter, and
wherein the outer diameter of the fastener directly cooperates with the inner diameter of the eccentric hole to connect the door eccentric, wherein the door eccentric is configured to be received within a hole of the door leaf at the top end of the panel;
a bogie assembly to connect with the panel through the door eccentric assembly, wherein the bogie assembly comprises:
a bogie having a lower end, and an upper end opposite to the lower end, and
a plurality of rollers connected to the upper end of the bogie,
wherein the plurality of rollers is configured to slide the panel,
a door assembly having:
a frame including a surface,
a groove extending longitudinally on the surface of the frame,
a guide rail having a guide track, wherein the guide rail is inserted into the groove of the frame;
a pair of electromagnet assemblies having an electromagnet mounting bracket, wherein the pair of electromagnet assemblies is positioned on the frame by sliding the electromagnet mounting bracket in the groove on a top surface of the frame; and
a pair of manual lock sensor assemblies having a sensor mounting bracket, wherein the pair of manual lock sensor assemblies are connected to the frame by sliding the sensor mounting bracket in the groove provided on a lateral surface of the frame,
wherein the bogie assembly is configured to slide the panel through the plurality of rollers rolling on the guide track.

6. The door leaf of claim 5, wherein the door assembly further comprises:
a driver pulley assembly having a driver pulley,
a driven pulley assembly having a driven pulley, and
a belt loop assembly having a pulley belt wrapped around the driver pulley and the driven pulley to slide the door leaf to open and close the door leaf.

7. A door eccentric assembly for a bogie assembly comprising:
a door eccentric having a central axis, wherein the door eccentric is adapted to be received in a hole of the door leaf;
an eccentric hole in the door eccentric, wherein the eccentric hole is at an off-set from the central axis, and wherein the eccentric hole is a through hole, and comprises an inner diameter; and
first and second O-rings adjacent to the door eccentric and aligned along the central axis;
an anti-friction washer adjacent to the second O-ring, and aligned along the central axis, wherein the first and second O-rings and the anti-friction washer are adapted to be packed in between the door eccentric and a bogie assembly; and
a fastener having an outer diameter, and
wherein the outer diameter of the fastener directly cooperates with:
the inner diameter of the eccentric hole, and
an inner diameter of a through hole of the bogie assembly to affix the door leaf with the bogie assembly.

* * * * *